May 23, 1950 T. MURAKAMI 2,508,416

STABILIZED HIGH-FREQUENCY AMPLIFIER

Filed June 26, 1946

INVENTOR
Tomomi Murakami
BY
H. G. Grover
ATTORNEY

Patented May 23, 1950 2,508,416

UNITED STATES PATENT OFFICE 2,508,416

STABILIZED HIGH-FREQUENCY AMPLIFIER

Tomomi Murakami, Media, Pa., assignor to Radio Corporation of America, a corporation of Delaware Application June 26, 1946, Serial No. 679,306

5 Claims. (Cl. 179—171)

Figures 1, 2:
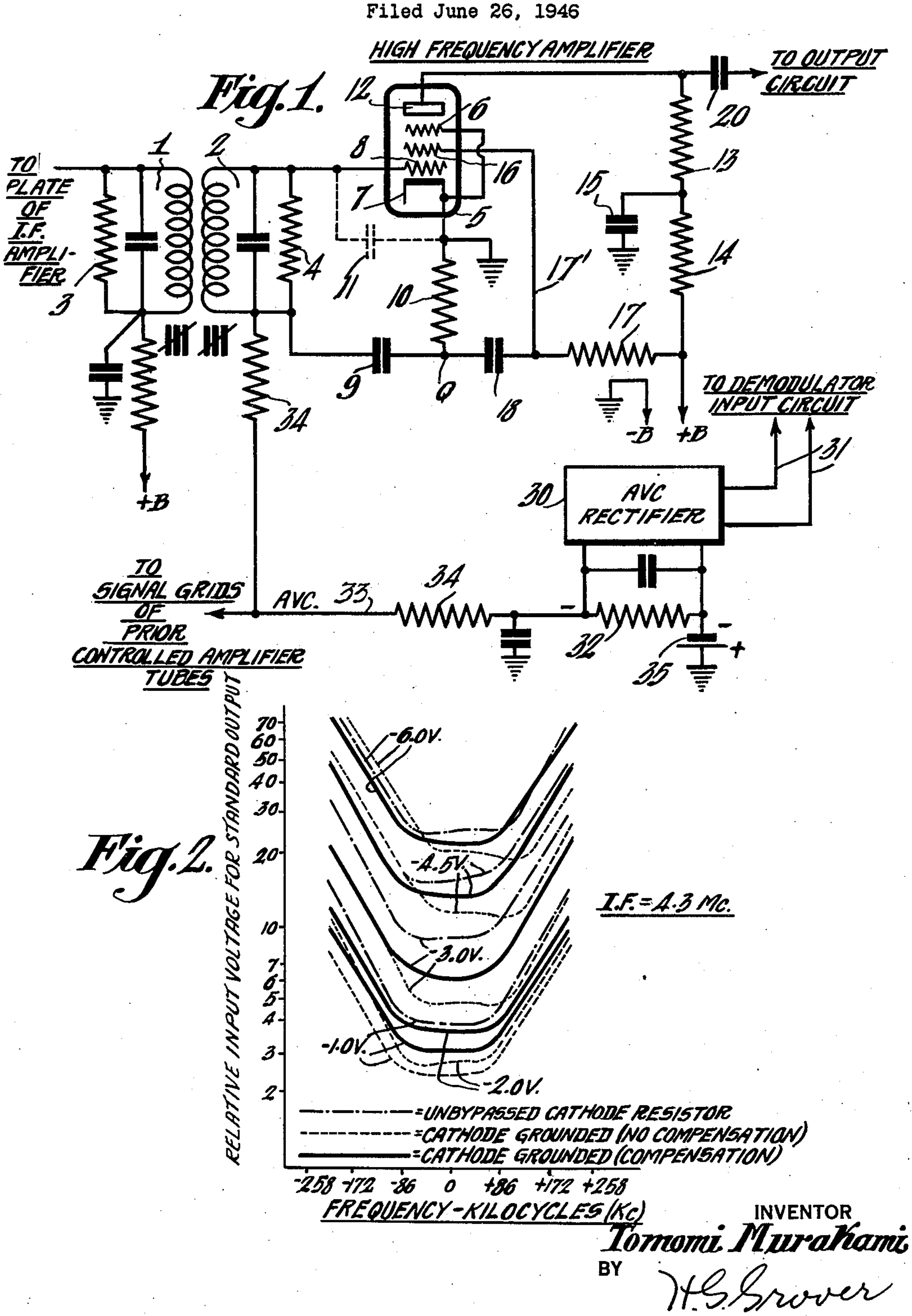

My present invention relates to stabilized high frequency amplifier circuits, and more particularly to a gain-regulated high frequency amplifier whose inherent input capacitance variation is automatically compensated for.

It has been observed in the past that the selective input circuit of a high frequency amplifier has its selectivity characteristic affected by changes in operating bias of the signal input, or control, grid of the high frequency amplifier tube. For example, when automatic volume control (AVC) is utilized in connection with an amplifier of high frequency signals, the tuned input circuit of the amplifier is substantially detuned in response to a substantial increase in magnitude of the AVC bias. A. Van der Ziel in U. S. Patent No. 2,212,851, granted August 27, 1940, proposed the utilization of an unbypassed resistor in the cathode circuit of the amplifier tube as a means for minimizing the detuning effect of the selector input circuit of a high frequency amplifier caused by the AVC action. It has been found that as the frequency range of the signals increases, and bias control of the amplifier signal grid is employed, it is necessary to utilize the unbypassed cathode resistor.

However, while such unbypassed cathode resistor is usually satisfactory and provides a substantial measure of stabilization of the inherent input capacitance, yet there are many situations where the use of the unbypassed cathode resistor is dispensed with despite the fact that its presence would considerably aid in performance of the high frequency circuits. For example, in the case of a battery-operated receiver where the tubes often employ filament type cathodes, it is essential that the filament of the amplifier tube be at ground potential. In the aforesaid Van der Ziel circuit the ground connection is made at the end of the cathode resistor remote from the cathode connection, and it has not been considered possible to use that circuit in connection with an amplifier employing a filament type cathode. Again, in the case of tubes such as the type 6SG7, where the suppressor grid is internally connected to the cathode, the grounding of the remote end of the unbypassed cathode resistor has also been considered as an obstacle to use of that specific type of tube. In his application Serial No. 673,294, filed May 31, 1946, W. R. Koch has disclosed and claimed a circuit which permits the compensation action of the Van der Ziel circuit to be secured, while at the same time employing an amplifier tube whose cathode is directly grounded.

It is an important object of my present invention to provide a high frequency amplifier circuit wherein compensation for input capacitance changes due to changes in control grid bias are secured, with an amplifier tube whose cathode is directly grounded, but wherein the normal gain of the amplifier is maintained substantially higher than would be had in the case of the circuit shown in the Van der Ziel patent, i. e., an unbypassed cathode resistor whose end remote from the cathode connection is grounded.

Another object of this invention is to provide a high frequency amplifier circuit of the type disclosed in the aforesaid Koch application, but wherein, in addition, there is utilized the radio frequency components of the screen grid current to secure a substantially complete compensation of input capacitance variation.

Still another object of this invention is to provide a high frequency amplifier circuit especially adapted for utilization in the intermediate frequency amplifier network of a frequency modulation (FM) receiver which employs AVC action, and which amplifier is free of the detuning effect of input capacitance variation caused by the AVC bias.

Still other features and objects of my invention will best be understood by reference to the following description, taken in connection with the drawing, in which I have indicated diagrammatically a circuit organization whereby my invention may be carried into effect.

In the drawing,

Fig. 1 schematically illustrates an embodiment of the invention; and

Fig. 2 is a graphic illustration of the functioning of the amplifier shown in Fig. 1, as well as a comparison with the same amplifier circuit using other arrangements.

In Fig. 1 I have shown a high frequency amplifier circuit whose input and output networks are each tuned to a predetermined high frequency value. It is to be understood that the amplifier circuit shown in Fig. 1 can be included in either an amplitude modulated (AM) or frequency modulated carrier wave receiving system. While my invention is readily adapted for FM or AM reception, in the presently assigned respective bands of 88–108 megacycles (mc.) and 550–1700 kilocycles (kc.), it is to be clearly understood that the present invention is not limited to receivers operated in such specific frequency bands.

For the particular purpose of the present patent application let it be assumed that the invention is embodied in an FM receiver of the superheterodyne type, and that the amplifier circuit depicted in Fig. 1 is embodied in the intermediate frequency (I. F.) amplifier network of the receiver. The circuit, however, could be the I. F. amplifier of an AM receiver. In the case of FM reception the I. F. value will be chosen from a range up to at least 10 mc., but it is specifically assumed that each of input circuits 1 and 2 is tuned to an I. F. value of 4.3 mc. The coupled circuits 1 and 2 include respective damping resistors 3 and 4 so as to provide a response characteristic such that the circuit will pass a band of frequencies at least 200 kc. wide. This would be true of all the selector circuits in the receiving system by virtue of the fact that the transmission channel is 150 kc. wide. At the receiver the selector circuits are made 200 kc. wide to provide a degree of tolerance, as is well known to those skilled in the art of radio communication.

It will be understood that, in an FM superheterodyne receiver embodying the invention the signal receptor, such as an antenna of the dipole type, is generally connected to a selective radio frequency amplifier followed by a mixer, or frequency converter, which functions to produce the I. F. signals for the following I. F. amplifier network. While in Fig. 1 I have only shown a single I. F. amplifier tube 5, it is to be understood that the amplifier stage shown may be preceded by a prior I. F. amplifier, and may be followed by an additional stage if desired. However, it is to be clearly understood that the final I. F. amplifier stage will feed into an FM detector of any suitable construction, and that the latter will generally feed one or more audio frequency amplifiers followed by a reproducer, such as a loud speaker.

The high frequency amplifier tube 5 in this case is shown as of the pentode type. The tube may be of the 6SG7 type whose suppressor grid 6 is internally connected to the cathode 7. The tube 5 may be a metal tube or the receiver may be of the battery-operated type in which case the cathode 7 will be a filament cathode through which flows the heating current. In any event the cathode 7 is directly grounded, while the control grid 8 is connected to the high potential side of the selective input circuit 2. The low potential side of input circuit 2 is connected through the I. F. bypass condenser 9 to the ungrounded end of the unbypassed cathode resistor 10. The grounded end of resistor 10 is connected to the cathode 7. The numeral 11 denotes in dotted lines the inherent control grid to cathode capacitance. The latter becomes a major factor in affecting the selectivity characteristic of the selective input circuit as the frequency of the signals applied to the amplifier increases. The capacitance 11 is an appreciable part of the tuned circuit capacity at the 4.3 mc. frequency.

The plate 12 is connected to the +B terminal of the direct current supply source (not shown), whether it be a battery or any other source, through the resistors 13 and 14, the junction of the resistors being bypassed to ground for I. F. currents by condenser 15. The screen grid 16 is connected through resistor 17 to the +B terminal, the resistor 17 having a magnitude such that the voltage is dropped to a suitable voltage for the screen grid.

In accordance with my present invention the screen lead 17' is connected to the ungrounded end of cathode resistor 10 through the condenser 18. The condenser 18 has a substantially low impedance to I. F. currents. The voltage developed across the output circuit of the amplifier tube 5 may be transmitted through condenser 20 to further I. F. selector circuits. Furthermore, it is to be understood that the various coils employed in the respective selective circuits may be of the variable inductance type wherein magnetic iron cores are used. Resistor 13 and capacitor 20 may be replaced by a tuned circuit, or by the primary of an I. F. transformer.

The use of AVC is well known, and is widely employed in receiver systems whether they be AM or FM. For this reason I have depicted the AVC system in a schematic manner. The AVC bias may be derived from the FM detector circuit. It can be derived from a special or suitable detector, or rectifier, to which is applied the I. F. signal, and from which is produced a rectified control voltage whose magnitude is proportional to the relatively slow carrier amplitude variation of the I. F. signals. In Fig. 1 I have indicated the rectangle 30 as the AVC rectifier. It is to be clearly understood that the input connections 31 are made to any desired point between the plate circuit of tube 5 and the FM detector circuit. However, if the AVC bias is derived directly from the output circuit of the FM detector, then the AVC connection is made directly to the point of negative voltage at the FM detector output load. The load resistor 32 of AVC rectifier 30, suitably bypassed for I. F. currents, has the negative end thereof connected to the low potential end of circuit 2 through AVC lead 33 which preferably includes suitable filter resistors 34. The line 33 may be connected to the signal grids of prior high frequency amplifiers to be regulated in gain.

If desired, there may be included a source 35 of negative bias between ground and the positive end of resistor 32. Since cathode 7 is directly grounded, the source 35 will provide a normal, or no-signal, grid bias for control grid 8. Of course, the negative bias source 35 may be a suitable tap on the power supply network of the receiver system.

It is to be clearly understood that the AVC voltage may be provided, in general, by any suitable means responsive to carrier amplitude variation. The AVC circuit acts to vary the gain of each controlled amplifier tube in a sense to compensate for relatively slow carrier amplitude variation at the signal collector device thereby to maintain the carrier amplitude at the demodulator input substantially uniform over a wide range of carrier amplitude variation at the signal collector device. The grid to cathode capacitance 11 appears to be dependent in part on the so-called electron cloud in the space between grid 8 and cathode 7. This density and hence the magnitude of capacitance 11, appears to shift with bias change at grid 8. Any change in magnitude of capacitance 11 causes a substantial change in the selectivity of circuit 2. Indeed, the circuit 2 is substantially detuned with extreme values of AVC bias.

Compensation for input capacitance variation is provided by the conjoint action of unbypassed resistor 10 and the condenser 18. The radio frequency components of the screen current are fed into the control grid circuit by the use of condenser 18 and resistor 10. By choosing the magnitude of resistor 10 of suitable value, proper compensation of the input capacitance variation is obtained. The selectivity of the input grid circuit is maintained substantially uniform regardless of AVC bias variation.

While it is not desired to restrict the invention to any specific circuit constants, the following illustrative values are given:

Condenser 9=0.01 microfarad (mf.)
Condenser 18=0.01 microfarad (mf.)
Condenser 15=0.01 microfarad (mf.)
Resistor 17=18,000 ohms
Resistor 10=150 ohms In the case of resistor 10, the value given is for the particular tube used. However, the value of this resistor will vary with different type tubes for proper compensation of input capacity 11.

In the circuit shown in Fig. 1 signal voltage appears at the screen grid 16 and is applied to end Q of the unbypassed cathode resistor 10 through condenser 18. This signal voltage applied to point Q is opposite in phase with respect to the input signals at grid 8 and decreases the resulting intensity of the input signals. This corresponds to degenerative feedback and when resistor 10 is properly chosen, the feedback will compensate for changes in input capacitance 11 upon variation of input bias. A feature of the invention is that the resistor 10 does not develop a D. C. voltage.

The following further theoretical explanation is suggested to explain why the feedback from the screen to the grid circuit provides the desired result. Consider the control grid to be instantaneously positive with respect to the average operating point. There will be a component of space current leading the applied voltage by 90° flowing between the cathode and control grid, due to the capacitance between these two electrodes. When the control grid becomes positive the screen becomes less positive because the screen current is increased and the potential drop across the resistor 17 increases. The voltage change of the screen is fed back to the control grid through condenser 9, and tends to reduce the capacitative current components between the control grid and the cathode since the feedback is 180° out of phase with the input current. When the feedback is suitably arranged, changes in capacitive currents due to variation in capacitance 11 are just balanced by changes in feedback intensity due to variation in tube gain, and the stage operates as though the capacitance 11 were unvarying.

In Fig. 2 there is graphically depicted the action of several types of I. F. amplifiers subject to input bias variation. The advantages of my present invention are emphasized by comparison with the operation of two other types of amplifier circuits. Thus, Fig. 2 shows three sets of curves secured by plotting "Frequency" as abscissae against "Input voltage" as ordinates. The center or normal frequency of the applied signal is 4.3 mc., the frequency being varied either way ±258 kc. The input voltage is measured in millivolts for a constant output voltage of 0.5 volt.

The solid line set of curves illustrate the substantially uniform selectivity maintained despite successively increased values of negative bias at grid 8 (from −1.0 volt to −6.0 volts). The change in negative bias corresponds to the variation in AVC bias. These solid line curves show the effect of using the circuit of my invention. By contrast the dashed line set of curves shows the action of the same amplifier circuit (that is, in Fig. 1) with the invention omitted. The cathode is grounded, bias is directly applied to grid 8, and the screen grid is bypassed to ground. The effect of the variation in negative bias (from −1.0 volt to −6.0 volts) is shown in the marked change in selectivity. The center frequency shifts substantially to an increased frequency as the magnitude of the bias increases in a negative sense. By further contrast, there is shown a set of dot-dash line curves to illustrate the effect of negative grid bias variation on selectivity in the case of the amplifier embodying an unbypassed cathode resistor in accordance with the Van der Ziel patent. In this case the cathode 7 is assumed connected to ground through the unbypassed resistor, while the low potential side of the input circuit and the screen grid are bypassed to ground. The change in selectivity is illustrated for the change in grid bias from −1.0 volt to −6.0 volts.

The three sets of selectivity curves reveal the following. Comparing the present circuit to the uncompensated circuit, the gain is down 2 decibels (db) at a grid voltage of −1.0 volt from the gain of the uncompensated amplifier. At a grid bias of −6.0 volts the loss in gain is about 0.8 db. Hence, with somewhat of a gain loss it is possible to secure substantial perfect compensation for input capacitance variation, and yet use a grounded cathode. In the case of the unbypassed cathode resistor of the Van der Ziel type (dot and dash curves) the feedback current includes the radio frequency component of the plate current, whereas in my circuit of Fig. 1 only the radio frequency screen current is utilized. The gain is down 4.5 db at −1.0 volt and 1.2 db at a grid bias of −6.0 volts, compared to the gain of the uncompensated amplifier (dashed line curves). It is obvious, therefore, that with my circuit there is secured the compensation of the Van der Ziel circuit, less loss of gain and the desirable use of a grounded cathode.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In a variably-biased electronic amplification system for amplifying electric signals varying at frequencies of the order of 4.3 megacycles or more per second: an electron discharge tube having an electron-emitting cathode, an electron collecting plate, a control grid between the cathode and the plate for varying the passage of electrons from the cathode to the plate in accordance with the instantaneous voltage of the grid with respect to the cathode, and an additional screen grid between the control grid and plate for improving the electron passage to the plate; energizing means connected for maintaining said plate and said screen grid at positive potentials with respect to said cathode; a common return conductor; said cathode being connected to and maintained at the potential of said common return conductor; input circuit means including parallel resonant circuit elements, tuned to said signal frequencies, connected to the control grid and said common return conductor for supplying said signals to the control grid with respect to said cathode; said energizing means including plate energizing elements and screen energizing elements connected respectively to the plate and to said screen grid for carrying electron passage current variations corresponding to input signals reversed in phase; output circuit means forming part of said plate energizing elements for delivering electron passage current variations corresponding to amplified input signals; and variable bias means connected for applying a variable D. C. bias voltage between the control grid and cathode to vary the controlling effect of high frequency grid voltages on the electron passage; said input circuit means and said screen energizing elements having a feedback connection including a capacitive link between the screen grid and the common return portion of the input circuit for returning the electron passage current variations from the screen energizing elements back to the input circuit means in phase opposition to the high frequency input signals and thereby diminish input circuit detuning notwithstanding the unavoidable changes in the inherent capacitance between the control grid and cathode as a result of changes in said bias voltage.

2. A variably-biased amplification system as defined by claim 1 in which the feedback connection additionally includes a resistance forming a part of the common return portion of the input circuit, to which resistance the screen grid is capacitively connected.

3. A variably-biased amplification system as defined by claim 2 in which the energizing means is conductively connected to the screen grid through an impedance.

4. A variably-biased amplification system as defined by claim 1 in which the variable bias controls the gain of the amplifier and is connected to automatically respond to the intensity of the amplified signals for providing automatic volume control.

5. A variably-biased amplification system as defined by claim 1 in which the electron-discharge tube includes a suppressor grid between the screen grid and the plate to further improve the passage of electrons, said suppressor being directly connected to the cathode internally of the tube.

TOMOMI MURAKAMI.

REFERENCES CITED

The following references are of record in the file of this patent:

UNITED STATES PATENTS

| Number | Name | Date |
|---|---|---|
| 2,210,001 | Perkins | Aug. 6, 1940 |
| 2,248,804 | Black | July 8, 1941 |
| 2,282,605 | Lindsay | May 12, 1942 |
| 2,315,043 | Boucke | Mar. 30, 1943 |
| 2,352,956 | Strutt | July 4, 1944 |
| 2,397,850 | Ford | Apr. 2, 1946 |